United States Patent
Hwang et al.

(10) Patent No.: US 10,088,018 B2
(45) Date of Patent: Oct. 2, 2018

(54) PLANETARY GEAR TRAIN OF AUTOMATIC TRANSMISSION FOR VEHICLES

(71) Applicant: Hyundai Motor Company, Seoul (KR)

(72) Inventors: Seong Wook Hwang, Gyeonggi-do (KR); Jong Soo Kim, Seoul (KR); Seongwook Ji, Gyeonggi-do (KR); Woochurl Son, Gyeonggi-do (KR); Hyun Sik Kwon, Seoul (KR); Jong Sool Park, Gyeonggi-do (KR); Ki Been Lim, Gyeonggi-do (KR); Hyu Tae Shim, Gyeonggi-do (KR); Jae Chang Kook, Gyeonggi-do (KR); Wonmin Cho, Gyeonggi-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 264 days.

(21) Appl. No.: 15/266,831

(22) Filed: Sep. 15, 2016

(65) Prior Publication Data
US 2017/0248203 A1    Aug. 31, 2017

(30) Foreign Application Priority Data
Feb. 26, 2016    (KR) .................. 10-2016-0023312

(51) Int. Cl.
*F16H 3/66*    (2006.01)
*F16H 3/78*    (2006.01)

(52) U.S. Cl.
CPC ....... *F16H 3/66* (2013.01); *F16H 2200/0073* (2013.01); *F16H 2200/2012* (2013.01); *F16H 2200/2048* (2013.01)

(58) Field of Classification Search
None
See application file for complete search history.

(56) References Cited

U.S. PATENT DOCUMENTS 8,303,454 B1 * 11/2012 Shim .................. F16H 3/66
                                                            475/280
2006/0142112 A1 * 6/2006 Kamada .............. F16H 3/663
                                                            475/275
(Continued)

FOREIGN PATENT DOCUMENTS

JP    2005-172123 A    6/2005
JP    2009-197927 A    9/2009
(Continued)

*Primary Examiner* — Colby M Hansen
(74) *Attorney, Agent, or Firm* — Brinks Gilson & Lione (57) ABSTRACT

The present disclosure provides a planetary gear train of an automatic transmission for a vehicle. The planetary gear train may include: an input shaft receiving torque of an engine; an output shaft outputting changed torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements. The planetary gear train improves power delivery performance and fuel economy by achieving at least eleven forward speed stages and widening speed ratio (or gear ratio) with a reduced number of constituent elements being used, and secures linearity of step ratios.

13 Claims, 3 Drawing Sheets

(56) References Cited

U.S. PATENT DOCUMENTS

2010/0331138 A1* 12/2010 Phillips .................... F16H 3/66
                                                                          475/278
2012/0172173 A1* 7/2012 Wittkopp ................. F16H 3/66
                                                                          475/277

FOREIGN PATENT DOCUMENTS

| KR | 10-2012-0132022 A | 12/2012 |
| KR | 10-2014-0046240 A | 4/2014 |

\* cited by examiner

| Speed Stage | Control element | | | | | | | Gear Ratio |
|---|---|---|---|---|---|---|---|---|
| | C1 | C2 | C3 | B1 | B2 | B3 | B4 | |
| D1 |  | ● |  |  | ● |  | ● | 6.127 |
| D2 |  |  | ● |  | ● |  | ● | 3.738 |
| D3 |  | ● | ● |  |  |  | ● | 2.700 |
| D4 | ● |  | ● | ● |  |  | ● | 1.882 |
| D5 | ● |  |  | ● |  |  | ● | 1.548 |
| D6 | ● |  | ● | ● |  |  |  | 1.261 |
| D7 | ● | ● | ● |  |  |  |  | 1.000 |
| D8 | ● | ● |  |  | ● |  |  | 0.883 |
| D9 | ● |  |  |  | ● |  |  | 0.790 |
| D10 | ● |  |  |  | ● | ● |  | 0.677 |
| D11 |  | ● |  |  |  | ● |  | 0.594 |
| REV |  | ● |  |  |  | ● | ● | 6.210 |

FIG. 3

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2016-0023312, filed on Feb. 26, 2016, the entire contents of which are incorporated herein by reference.

FIELD

The present disclosure relates to an automatic transmission for a vehicle. More particularly, the present disclosure relates to a planetary gear train of an automatic transmission for a vehicle.

BACKGROUND

The statements in this section merely provide background information related to the present disclosure and may not constitute prior art.

Generally, an automatic transmission achieving more speed stages has been developed to enhance fuel economy and optimize drivability.

Such an automatic transmission achieving more speed stages is preferred to maximize power performance and driving efficiency according to downsizing of an engine. Particularly, we have discovered that a high efficiency multiple-speeds transmission having excellent linearity of step ratios can be used as an index closely related to drivability such as acceleration before and after shift and rhythmical engine speed in order to secure competitiveness in the automatic transmission field.

However, in the automatic transmission, as the number of speed stages increase, the number of internal components increase, and as a result, mountability, cost, weight, transmission efficiency, and the like may still deteriorate.

Accordingly, development of a planetary gear train which may achieve improved efficiency with a small number of components can increase a fuel efficiency enhancement effect through the multiple-speeds.

In this aspect, in recent years, 8-speed automatic transmissions tend to be implemented and the research and development of a planetary gear train capable of implementing more speed stages has also been actively conducted.

However, since a conventional 8-speed automatic transmission has gear ratio span of 6.5-7.5 (gear ratio span is an important factor for securing linearity of step ratios), improvement of power performance and fuel economy may not be very good.

In addition, if an 8-speed automatic transmission has a gear ratio span larger than 9.0, it is hard to secure linearity of step ratios. Therefore, driving efficiency of an engine and drivability of a vehicle may be deteriorated.

The above information disclosed in this Background section is only for enhancement of understanding of the background of the disclosure and therefore it may contain information that does not form the prior art that is already known to a person of ordinary skill in the art.

Further areas of applicability will become apparent from the description provided herein. It should be understood that the description and specific examples are intended for purposes of illustration only and are not intended to limit the scope of the present disclosure.

SUMMARY

The present disclosure provides a planetary gear train of an automatic transmission for a vehicle having advantages of improving power delivery performance and fuel economy by achieving at least eleven forward speed stages and one reverse speed stage, and widening a gear ratio span and of securing linearity of step ratios.

A planetary gear train of an automatic transmission for a vehicle according to one form of the present disclosure may include: an input shaft receiving torque of an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a first shaft connected with the first rotation element; a second shaft connecting the second rotation element, the sixth rotation element, and the seventh rotation element; a third shaft connecting the third rotation element and the fifth rotation element; a fourth shaft connected with the fourth rotation element; a fifth shaft connected with the eighth rotation element and directly connected with the output shaft; a sixth shaft connected with the ninth rotation element; a seventh shaft connected with the eleventh rotation element, selectively connected with the third shaft or the fourth shaft, and directly connected with the input shaft; and an eighth shaft connected with one of the tenth rotation element or the twelfth rotation element.

The first shaft, the third shaft, the fourth shaft, and the sixth shaft may be selectively connected with the transmission housing.

The eighth shaft may be connected with the twelfth rotation element and selectively connected with the fifth shaft, and the tenth rotation element may be connected with the second shaft.

The planetary gear train may further include: a first clutch selectively connecting the fifth shaft and the eighth shaft; a second clutch selectively connecting the fourth shaft and the seventh shaft; a third clutch selectively connecting the third shaft and the seventh shaft; a first brake selectively connecting the fourth shaft with the transmission housing; a second brake selectively connecting the first shaft with the transmission housing; a third brake selectively connecting the third shaft with the transmission housing; and a fourth brake selectively connecting the sixth shaft with the transmission housing.

The eighth shaft may be connected with the tenth rotation element and selectively connected with the second shaft, and the twelfth rotation element may be connected with the fifth shaft.

The planetary gear train may further include: a first clutch selectively connecting the second shaft and the eighth shaft; a second clutch selectively connecting the fourth shaft and the seventh shaft; a third clutch selectively connecting the third shaft and the seventh shaft; a first brake selectively connecting the fourth shaft with the transmission housing; a second brake selectively connecting the first shaft with the transmission housing; a third brake selectively connecting the third shaft with the transmission housing; and a fourth brake selectively connecting the sixth shaft with the transmission housing.

The first, second, and third rotational elements of the first planetary gear set may be respectively a first sun gear, a first planet carrier, and a first ring gear of the first planetary gear set, the fourth, fifth, and sixth rotational elements of the second planetary gear set may be respectively a second sun gear, a second planet carrier, and a second ring gear of the second planetary gear set, the seventh, eighth, and ninth rotational elements of the third planetary gear set may be respectively a third sun gear, a third planet carrier, and a third ring gear of the third planetary gear set, and the tenth, eleventh, and twelfth rotational elements of the fourth planetary gear set may be respectively a fourth sun gear, a fourth planet carrier, and a fourth ring gear of the fourth planetary gear set.

One form of the present disclosure may achieve at least eleven forward speed stages and one reverse speed stage by combining four planetary gear sets being simple planetary gear sets with seven control elements.

In addition, driving efficiency of the engine may be maximized by at least eleven forward speed stages. In addition, since linearity of step ratios can be secured due to multiple speed stages, drivability such as acceleration before and after shift, rhythmical engine speed, and so on may be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DESCRIPTION OF SYMBOLS

B1, B2, B3, B4: first, second, third, and fourth brakes
C1, C2, C3: first, second, and third clutches
PG1, PG2, PG3, PG4: first, second, third, and fourth planetary gear sets
S1, S2, S3, S4: first, second, third, and fourth sun gears
PC1, PC2, PC3, PC4: first, second, third, and fourth planet carriers
R1, R2, R3, R4: first, second, third, and fourth ring gears
IS: input shaft
OS: output shaft
TM1, TM2, TM3, TM4, TM5, TM6, TM7, TM8: first, second, third, fourth, fifth, sixth, seventh, and eighth shafts

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, one form of the present disclosure will be described in detail with reference to drawings.

However, parts which are not related with the description are omitted for clearly describing the forms of the present disclosure and like reference numerals refer to like or similar elements throughout the specification.

In the following description, dividing names of components into first, second, and the like is to divide the names because the names of the components are the same as each other and an order thereof is not particularly limited. As used herein, "connect" and its variants includes connection for transmission of force such as torque, e.g., a first component connected to a second component for rotation therewith, or a first component connected to a second component for fixation of the components, e.g. braking or restraining movement.

Figure 1:
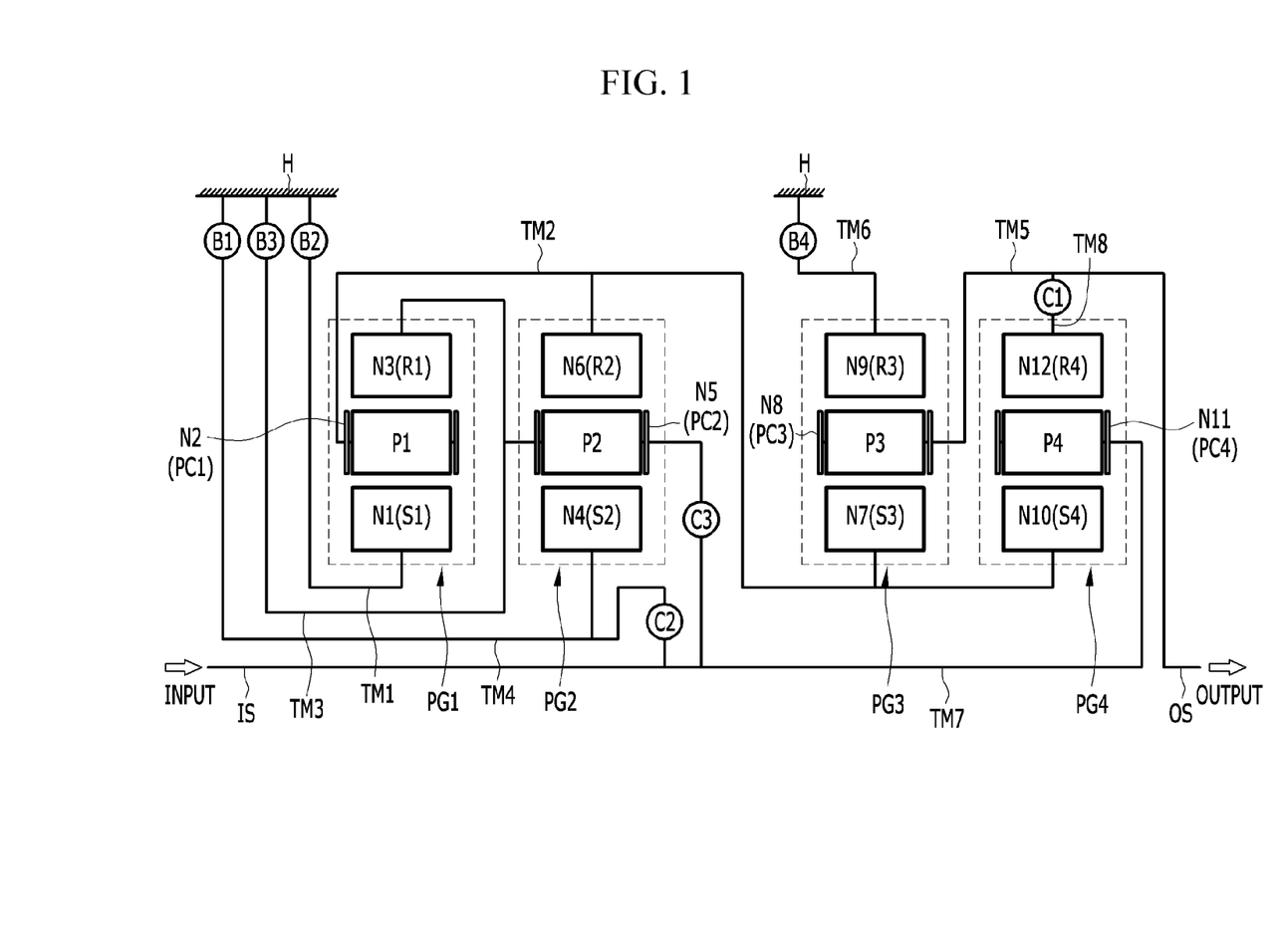
FIG. 1 is a schematic diagram of a planetary gear train according to a first form of the present disclosure.

FIG. 1 is a schematic diagram of a planetary gear train according to a first form of the present disclosure.

Referring to FIG. 1, a planetary gear train includes first, second, third, and fourth planetary gear sets PG1, PG2, PG3, and PG4 arranged on the same axis, an input shaft IS, an output shaft OS, eight shafts TM1 to TM8 interconnecting rotational elements of the first, second, third, and fourth planetary gear sets PG1, PG2, PG3, and PG4, three clutches C1 to C3 and four brakes B1 to B4 as control elements, and a transmission housing H.

Torque input from the input shaft IS is shifted by cooperative operation of the first, second, third, and fourth planetary gear sets PG1, PG2, PG3, and PG4, and then output through the output shaft OS.

The planetary gear sets are arranged in the order of first, second, third, and fourth planetary gear sets PG1, PG2, PG3, and PG4, from an engine side.

The input shaft IS is an input member and the torque from a crankshaft of an engine is input into the input shaft IS, after being torque-converted through a torque converter.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 respectively as fourth, fifth, and sixth rotation elements N4, N5, and N6.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 respectively as seventh, eighth, and ninth rotation elements N7, N8, and N9.

The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 respectively as tenth, eleventh, and twelfth rotation elements N10, N11, and N12.

The second rotation element N2, the sixth rotation element N6, the seventh rotation element N7 and the tenth rotation element N10 are directly connected with each other, and the third rotation element N3 is directly connected to the fifth rotation element N5 by two shafts among the eight shafts TM1 to TM8.

The eight shafts TM1 to TM8 will be described in further detail.

The eight shafts TM1 to TM8 directly connect a plurality of rotation elements among the rotation elements of the planetary gear sets PG1, PG2, PG3, and PG4, and are rotation members that are directly connected to any one rotation element of the planetary gear sets PG1, PG2, PG3, and PG4 and rotate with the any one rotation element to transmit torque, or are fixed members that directly connect any one rotation element (or more) of the planetary gear sets PG1, PG2, PG3, and PG4 to the transmission housing H to fix the any one rotation element.

The first shaft TM1 is connected with the first rotation element N1 (first sun gear S1) and selectively connected with the transmission housing H.

The second shaft TM2 directly connects the second rotation element N2 (first planet carrier PC1), the sixth rotation element N6 (second ring gear R2), the seventh rotation element N7 (third sun gear S3) and the tenth rotation element N10 (fourth sun gear S4).

The third shaft TM3 directly connects the third rotation element N3 (first ring gear R1) and the fifth rotation element N5 (second planet carrier PC2), and is selectively connected with the transmission housing H.

The fourth shaft TM4 is connected with the fourth rotation element N4 (second sun gear S2), and selectively connected with the transmission housing H.

The fifth shaft TM5 is connected with the eighth rotation element N8 (third planet carrier PC3), and directly connected with the output shaft OS, thereby always acting as an output element.

The sixth shaft TM6 is connected with the ninth rotation element N9 (third ring gear R3), and selectively connected with the transmission housing H.

The seventh shaft TM7 is connected with the eleventh rotation element N11 (fourth planet carrier PC4), selectively connected with the third shaft TM3 and the fourth shaft TM4, and directly connected with the input shaft IS, thereby always acting as an input element.

The eighth shaft TM8 is connected with the twelfth rotation element N12 (fourth ring gear R4), and selectively connected with the fifth shaft TM5.

In addition, three clutches C1, C2, and C3 are disposed at portions at which any two shafts among the eight shafts TM1 to TM8 including the input shaft IS and the output shaft OS are selectively connected to each other.

In addition, four brakes B1, B2, B3, and B4 are disposed at portions at which any one shaft among the eight shafts TM1 to TM8 is selectively connected to the transmission housing H.

Arrangements of the three clutches C1 to C3 and the four brakes B1 to B4 are described in detail.

The first clutch C1 is disposed between the fifth shaft TM5 and the eighth shaft TM8, and selectively connects the fifth shaft TM5 with the eighth shaft TM8.

The second clutch C2 is disposed between the fourth shaft TM4 and the seventh shaft TM7, and selectively connects the fourth shaft TM4 and the seventh shaft TM7.

The third clutch C3 is disposed between the third shaft TM3 and the seventh shaft TM7, and selectively connects the third shaft TM3 and the seventh shaft TM7.

The first brake B1 is disposed between the fourth shaft TM4 and the transmission housing H, and selectively connects the fourth shaft TM4 with the transmission housing H.

The second brake B2 is disposed between the first shaft TM1 and the transmission housing H, and selectively connects the first shaft TM1 with the transmission housing H.

The third brake B3 is disposed between the third shaft TM3 and the transmission housing H, and selectively connects the third shaft TM3 with the transmission housing H.

The fourth brake B4 is disposed between the sixth shaft TM6 and the transmission housing H, and selectively connects the sixth shaft TM6 with the transmission housing H.

The control elements including the first, second, and third clutches C1, C2, and C3 and the first, second, third, and fourth brakes B1, B2, B3, and B4 may be multi-plates friction elements of wet type that are operated by hydraulic pressure, although other types of clutches or brakes may also be employed.

Figure 2:
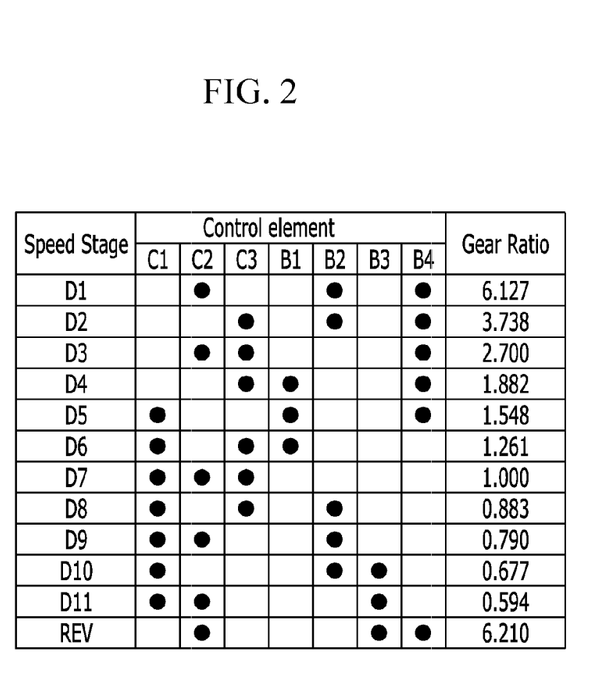
FIG. 2 is an operational chart for respective friction elements at respective shift-stages in a planetary gear train according to a form of the present disclosure.

FIG. 2 is an operational chart for respective friction elements at respective shift-stages in a planetary gear train according to a first form of the present disclosure.

Referring to FIG. 2, three control elements among the first, second, and third clutches C1, C2, and C3 and the first, second, third, and fourth brakes B1, B2, B3, and B4 are operated at each speed stage in the planetary gear train. The forms of the present disclosure can achieve at least one reverse speed stage and at least eleven forward speed stages.

The second clutch C2 and second and fourth brakes B2 and B4 are simultaneously operated at a first forward speed stage D1.

In a state that the fourth shaft TM4 is connected to the seventh shaft TM7, torque of the input shaft IS is input to the fourth shaft TM4 and the seventh shaft TM7. In addition, the first shaft TM1 and the sixth shaft TM6 are operated as the fixed elements. Therefore, the torque of the input shaft IS is shifted into the first forward speed stage, and the first forward speed stage is output to the output shaft OS connected to the fifth shaft TM5.

The third clutch C3 and second and fourth brakes B2 and B4 are simultaneously operated at a second forward speed stage D2.

In a state that the third shaft TM3 is connected to the seventh shaft TM7, the torque of the input shaft IS is input to the third shaft TM3 and the seventh shaft TM7. In addition, the first shaft TM1 and the sixth shaft TM6 are operated as the fixed elements. Therefore, the torque of the input shaft IS is shifted into the second forward speed stage, and the second forward speed stage is output to the output shaft OS connected to the fifth shaft TM5.

The second and third clutches C2 and C3 and fourth brake B4 are simultaneously operated at a third forward speed stage D3.

In a state that the fourth shaft TM4 is connected to the seventh shaft TM7 and the third shaft TM3 is connected to the seventh shaft TM7, the torque of the input shaft IS is input to the third shaft TM3, the fourth shaft TM4 and the seventh shaft TM7. In addition, the sixth shaft TM6 is operated as the fixed elements. Therefore, the torque of the input shaft IS is shifted into the third forward speed stage, and the third forward speed stage is output to the output shaft OS connected to the fifth shaft TM5.

The third clutch C3 and first and fourth brakes B1 and B4 are simultaneously operated at a fourth forward speed stage D4.

In a state that the third shaft TM3 is connected to the seventh shaft TM7, the torque of the input shaft IS is input to the seventh shaft TM7. In addition, the fourth shaft TM4 and the sixth shaft TM6 are operated as the fixed elements. Therefore, the torque of the input shaft IS is shifted into the fourth forward speed stage, and the fourth forward speed stage is output to the output shaft OS connected to the fifth shaft TM5.

The first clutch C1 and first and fourth brakes B1 and B4 are simultaneously operated at a fifth forward speed stage D5.

In a state that the fifth shaft TM5 is connected to the eighth shaft TM8, the torque of the input shaft IS is input to the seventh shaft TM7. In addition, the fourth shaft TM4 and the sixth shaft TM6 are operated as the fixed elements. Therefore, the torque of the input shaft IS is shifted into the fifth forward speed stage, and the fifth forward speed stage is output to the output shaft OS connected to the fifth shaft TM5.

The first and third clutches C1 and C3 and first brake B1 are simultaneously operated at a sixth forward speed stage D6.

In a state that the fifth shaft TM5 is connected to the eighth shaft TM8 and the third shaft TM3 is connected to the seventh shaft TM7, the torque of the input shaft IS is input to the third shaft TM3 and the seventh shaft TM7. In addition, the fourth shaft TM4 is operated as the fixed elements. Therefore, the torque of the input shaft IS is shifted into the sixth forward speed stage, and the sixth forward speed stage is output to the output shaft OS connected to the fifth shaft TM5.

The first, second, and third clutches C1, C2, and C3 are simultaneously operated at a seventh forward speed stage D7.

Since the fifth shaft TM5 is connected to the eighth shaft TM8, the fourth shaft TM4 is connected to the seventh shaft TM7, and the third shaft TM3 is connected to the seventh shaft TM7, all the planetary gear sets become lock-up states. In this state, the torque of the input shaft IS is input to the third shaft TM3, the fourth shaft TM4, and seventh shaft TM7 and the seventh forward speed stage is output to the output shaft OS connected to the seventh shaft TM7. Rotation speed that is the same as rotation speed of the input shaft IS is output at the seventh forward speed stage.

The first and third clutches C1 and C3 and the second brake B2 are simultaneously operated at an eighth forward speed stage D8.

In a state that the fifth shaft TM5 is connected to the eighth shaft TM8 and the third shaft TM3 is connected to the seventh shaft TM7, the torque of the input shaft IS is input to the third shaft TM3 and the seventh shaft TM7. In addition, the first shaft TM1 is operated as the fixed elements. Therefore, the torque of the input shaft IS is shifted into the eighth forward speed stage, and the eighth forward speed stage is output to the output shaft OS connected to the fifth shaft TM5.

The first and second clutches C1 and C2 and the second brake B2 are simultaneously operated at a ninth forward speed stage D9.

In a state that the fifth shaft TM5 is connected to the eighth shaft TM8 and the fourth shaft TM4 is connected to the seventh shaft TM7, the torque of the input shaft IS is input to the fourth shaft TM4 and the seventh shaft TM7. In addition, the first shaft TM1 is operated as the fixed elements. Therefore, the torque of the input shaft IS is shifted into the ninth forward speed stage, and the ninth forward speed stage is output to the output shaft OS connected to the fifth shaft TM5.

The first clutch C1 and the second and third brakes B2 and B3 are simultaneously operated at a tenth forward speed stage D10.

In a state that the fifth shaft TM5 is connected to the eighth shaft TM8, the torque of the input shaft IS is input to the seventh shaft TM7. In addition, the first shaft TM1 and the third shaft TM3 are operated as the fixed elements. Therefore, the torque of the input shaft IS is shifted into the tenth forward speed stage, and the tenth forward speed stage is output to the output shaft OS connected to the fifth shaft TM5.

The first and second clutches C1 and C2 and the third brake B3 are simultaneously operated at an eleventh forward speed stage D11.

In a state that the fifth shaft TM5 is connected to the eighth shaft TM8 and the fourth shaft TM4 is connected to the seventh shaft TM7, the torque of the input shaft IS is input to the fourth shaft TM4 and the seventh shaft TM7. In addition, the third shaft TM3 is operated as the fixed elements. Therefore, the torque of the input shaft IS is shifted into the eleventh forward speed stage, and the eleventh forward speed stage is output to the output shaft OS connected to the fifth shaft TM5.

The second clutch C2 and the third and fourth brakes B3 and B4 are simultaneously operated at a reverse speed stage REV.

In a state that the fourth shaft TM4 is connected to the seventh shaft TM7, the torque of the input shaft IS is input to the fourth shaft TM4 and the seventh shaft TM7. In addition, the third shaft TM3 and the sixth shaft TM6 are operated as the fixed elements. Therefore, the torque of the input shaft IS is shifted into the reverse speed stage, and the reverse speed stage is output to the output shaft OS connected to the fifth shaft TM5.

Figure 3:
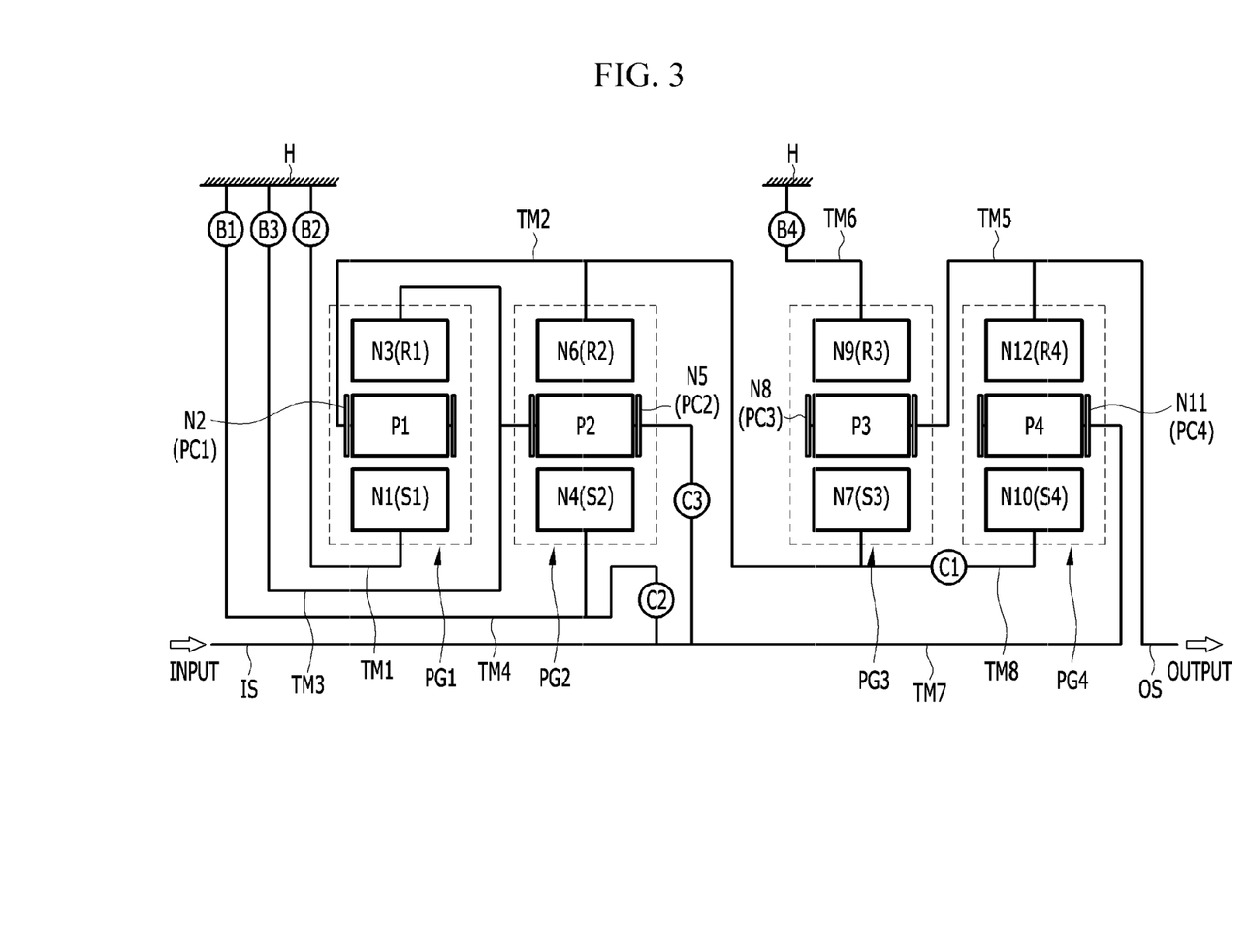
FIG. 3 is a schematic diagram of a planetary gear train according to a second form of the present disclosure.

FIG. 3 is a schematic diagram of a planetary gear train according to a second form of the present disclosure.

In a planetary gear train according to a first form of the present disclosure, the eighth shaft TM8 is connected with the twelfth rotation element N12 (fourth ring gear R4) and is selectively connected with the fifth shaft TM5 by the first clutch C1, and the tenth rotation element N10 (fourth sun gear S4) is connected with the second shaft TM2, as shown in FIG. 1.

However, referring to FIG. 3, the eighth shaft TM8 is connected with the tenth rotation element N10 (fourth sun gear S4) and is selectively connected with the second shaft TM2 by the first clutch C1, and the twelfth rotation element N12 (fourth ring gear R4) is connected with the fifth shaft TM5, in a planetary gear train according to a second form.

As a result, the second form merely differs from a planetary gear train according to a first form in a connection relationship of rotation elements of the third and fourth planetary gear sets PG3 and PG4 according to the location of the first clutch C1 but maintains a same operation and function, which is therefore not described in further detail.

The planetary gear train according to the forms of the present disclosure may achieve at least eleven forward speed stages and one reverse speed stage by combining four planetary gear sets PG1, PG2, PG3, and PG4 with the three clutches C1, C2, and C3 and the fourth brakes B1, B2, B3, and B4, thereby improving an engine driving efficiency and a fuel efficiency due to multiple speed stages.

In addition, since linearity of step ratios can be secured due to multiple speed stages, drivability such as acceleration before and after shift, rhythmical engine speed, and so on may be improved.

While this disclosure has been described in connection with what is presently considered to be practical forms, it is to be understood that the disclosure is not limited to the disclosed forms, but, on the contrary, is intended to cover various modifications and equivalent arrangements included within the spirit and scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A planetary gear train of an automatic transmission for a vehicle having an engine, the planetary gear train comprising:
   an input shaft receiving torque of the engine;
   an output shaft outputting torque;
   a first planetary gear set including first, second, and third rotation elements;
   a second planetary gear set including fourth, fifth, and sixth rotation elements;
   a third planetary gear set including seventh, eighth, and ninth rotation elements;
   a fourth planetary gear set including tenth, eleventh, and twelfth rotation elements;
   a first shaft connected with the first rotation element;
   a second shaft connecting the second rotation element, the sixth rotation element, and the seventh rotation element;
   a third shaft connecting the third rotation element and the fifth rotation element;
   a fourth shaft connected with the fourth rotation element;
   a fifth shaft connected with the eighth rotation element and directly connected with the output shaft;
   a sixth shaft connected with the ninth rotation element;
   a seventh shaft connected with the eleventh rotation element, selectively connected with one of the third shaft and the fourth shaft, and directly connected with the input shaft; and
   an eighth shaft connected with one of the tenth rotation element and the twelfth rotation element.

2. The planetary gear train of claim 1, wherein the first shaft, the third shaft, the fourth shaft, and the sixth shaft are selectively connected with a transmission housing.

3. The planetary gear train of claim 2, wherein the eighth shaft is connected with the twelfth rotation element and selectively connected with the fifth shaft, and the tenth rotation element is connected with the second shaft.

4. The planetary gear train of claim 2, wherein the eighth shaft is connected with the tenth rotation element and selectively connected with the second shaft, and the twelfth rotation element is connected with the fifth shaft.

5. The planetary gear train of claim 1, wherein the first, second, and third rotational elements of the first planetary gear set are respectively a first sun gear, a first planet carrier, and a first ring gear,
   wherein the fourth, fifth, and sixth rotational elements of the second planetary gear set are respectively a second sun gear, a second planet carrier, and a second ring gear,
   wherein the seventh, eighth, and ninth rotational elements of the third planetary gear set are respectively a third sun gear, a third planet carrier, and a third ring gear, and
   wherein the tenth, eleventh, and twelfth rotational elements of the fourth planetary gear set are respectively a fourth sun gear, a fourth planet carrier, and a fourth ring gear.

6. The planetary gear train of claim 3, further comprising:
   a first clutch selectively connecting the fifth shaft and the eighth shaft;
   a second clutch selectively connecting the fourth shaft and the seventh shaft;
   a third clutch selectively connecting the third shaft and the seventh shaft;
   a first brake selectively connecting the fourth shaft with the transmission housing;
   a second brake selectively connecting the first shaft with the transmission housing;
   a third brake selectively connecting the third shaft with the transmission housing; and
   a fourth brake selectively connecting the sixth shaft with the transmission housing.

7. The planetary gear train of claim 4, further comprising:
   a first clutch selectively connecting the second shaft and the eighth shaft;
   a second clutch selectively connecting the fourth shaft and the seventh shaft;
   a third clutch selectively connecting the third shaft and the seventh shaft;
   a first brake selectively connecting the fourth shaft with the transmission housing;
   a second brake selectively connecting the first shaft with the transmission housing;
   a third brake selectively connecting the third shaft with the transmission housing; and
   a fourth brake selectively connecting the sixth shaft with the transmission housing.

8. A planetary gear train of an automatic transmission for a vehicle having an engine, the planetary gear train comprising:
   an input shaft receiving torque of the engine;
   an output shaft outputting torque;
   a first planetary gear set including first, second, and third rotation elements;
   a second planetary gear set including fourth, fifth, and sixth rotation elements;
   a third planetary gear set including seventh, eighth, and ninth rotation elements; and
   a fourth planetary gear set including tenth, eleventh, and twelfth rotation elements,
   wherein the input shaft is directly connected with the eleventh rotation element,
   the output shaft is directly connected with the eighth rotation element,
   the first rotation element is selectively connected with a transmission housing,
   the second rotation element is directly connected with the sixth rotation element and the seventh rotation element,
   the third rotation element is directly connected with the fifth rotation element and selectively connected with the transmission housing,
   the fourth rotation element is selectively connected with the transmission housing,
   the ninth rotation element is selectively connected with the transmission housing, and the eleventh rotation element is selectively connected with the fourth rotation element or the fifth rotation element.

9. The planetary gear train of claim 8, wherein
the eighth rotation element is selectively connected with the twelfth rotation element, and
wherein the seventh rotation element is directly connected with the tenth rotation element.

10. The planetary gear train of claim 8, wherein
the eighth rotation element is directly connected with the twelfth rotation element, and
wherein the seventh rotation element is selectively connected with the tenth rotation element.

11. The planetary gear train of claim 8, wherein
the first, second, and third rotational elements of the first planetary gear set are respectively a first sun gear, a first planet carrier, and a first ring gear,
wherein the fourth, fifth, and sixth rotational elements of the second planetary gear set are respectively a second sun gear, a second planet carrier, and a second ring gear,
wherein the seventh, eighth, and ninth rotational elements of the third planetary gear set are respectively a third sun gear, a third planet carrier, and a third ring gear, and
wherein the tenth, eleventh, and twelfth rotational elements of the fourth planetary gear set are respectively a fourth sun gear, a fourth planet carrier, and a fourth ring gear.

12. The planetary gear train of claim 9, further comprising:
a first clutch selectively connecting the eighth rotation element and the twelfth rotation element;
a second clutch selectively connecting the fourth rotation element and the eleventh rotation element;
a third clutch selectively connecting the fifth rotation element and the eleventh rotation element;
a first brake selectively connecting the fourth rotation element with the transmission housing;
a second brake selectively connecting the first rotation element with the transmission housing;
a third brake selectively connecting the third rotation element with the transmission housing; and
a fourth brake selectively connecting the ninth rotation element with the transmission housing.

13. The planetary gear train of claim 10, further comprising:
a first clutch selectively connecting the seventh rotation element and the tenth rotation element;
a second clutch selectively connecting the fourth rotation element and the eleventh rotation element;
a third clutch selectively connecting the fifth rotation element and the eleventh rotation element;
a first brake selectively connecting the fourth rotation element with the transmission housing;
a second brake selectively connecting the first rotation element with the transmission housing;
a third brake selectively connecting the third rotation element with the transmission housing; and
a fourth brake selectively connecting the ninth rotation element with the transmission housing.

* * * * *